(12) United States Patent
Cook, Jr.

(10) Patent No.: US 6,450,472 B1
(45) Date of Patent: Sep. 17, 2002

(54) LOCKING ASSEMBLY FOR ALL-TERRAIN VEHICLES

(76) Inventor: Cecil Eugene Cook, Jr., 7600 Stormy La., Northport, AL (US) 35473

( * ) Notice: Subject to any disclaimer, the term of this patent is extended or adjusted under 35 U.S.C. 154(b) by 0 days.

(21) Appl. No.: 09/712,479

(22) Filed: Nov. 13, 2000

(51) Int. Cl.$^7$ ............................................. F16M 13/02
(52) U.S. Cl. ..................................... 248/551; 248/503
(58) Field of Search ................................ 248/551, 352, 248/503, 507, 678, 680, 681, 346.01, 500, 499; 211/5, 4; 410/3, 4, 7, 80, 2; 70/164, 234, 235

(56) References Cited

U.S. PATENT DOCUMENTS

| | | | | |
|---|---|---|---|---|
| 4,664,051 A | * | 5/1987 | Newkirk | 114/123 |
| 4,799,711 A | * | 1/1989 | Moore | 280/444 |
| 4,852,779 A | * | 8/1989 | Berg | 224/42.32 |
| 4,874,284 A | * | 10/1989 | New, Jr. | 414/537 |
| 5,529,448 A | * | 6/1996 | Kosma | 410/97 |
| 5,599,002 A | * | 2/1997 | Knutson | 248/552 |
| 5,685,554 A | * | 11/1997 | Poxleitner | 280/491.2 |
| 6,050,737 A | * | 4/2000 | Russell | 403/43 |
| 6,036,417 A | * | 5/2000 | Weaver | 410/7 |
| 6,059,496 A | * | 5/2000 | Stevens | 410/7 |
| 6,077,004 A | * | 6/2000 | Denman, Jr. | 410/8 |
| 6,099,219 A | * | 8/2000 | Bartholomay | 410/20 |
| 6,139,235 A | * | 10/2000 | Vander Koy et al. | 410/111 |
| 6,155,771 A | * | 12/2000 | Montz | 414/543 |

OTHER PUBLICATIONS

Internet Location: http://www.off–road.com/atv/reviews/hastyhitch/ Title: Off–Road.Com's Reviewer's Notebook—B&M Products, Inc., Hasty Hitch Author: Dean Waters pp. 1–3 Date: Downloaded on Aug. 23, 2000.

* cited by examiner

*Primary Examiner*—Anita King
*Assistant Examiner*—Ingrid Weinhold
(74) *Attorney, Agent, or Firm*—Christopher A. Holland; Robert J. Veal; Burr & Forman LLP (57) ABSTRACT

A locking assembly to secure an all-terrain vehicle on a platform includes a securing member attached to the all-terrain vehicle and a receiving member attached to the platform. The receiving member includes a base support member that is mounted to the platform and a post member that is perpendicularly attached to the base support member. The locking assembly additionally includes a locking clevis that is attached to the post member that is designed to couple with the securing member. The securing member includes a base plate that is attached to the front end of the frame of the all terrain vehicle, while a locking cantilever bar extends from the base plate. In operation, the locking cantilever bar is positioned proximate the arms of the locking clevis, and the securing member can thereby be coupled with the receiving member to secure the position of the all-terrain vehicle on the platform.

7 Claims, 8 Drawing Sheets

LOCKING ASSEMBLY FOR ALL-TERRAIN VEHICLES

FIELD OF THE INVENTION

The present invention relates to an apparatus for securing the position of an all-terrain vehicle. More specifically, the present invention relates to an apparatus locking an all-terrain vehicle on a transportable platform such that the all-terrain vehicle is protected from theft and undesired movement while stored on the platform.

BACKGROUND OF THE INVENTION

The use of locking systems for all-terrain vehicles is well-known. Locking systems for such vehicles are used to provide security of the all-terrain vehicles, both from theft and from undesired movement when the all-terrain vehicle is being transported. The most common examples of these locking devices provide security by prohibiting the full rotation of a vehicle's wheels. To achieve this result, the wheels are either locked together or locked independently with a device that at some point in the rotation of the wheels interacts with the structure of the vehicle thereby prohibiting further rotation of the wheels. In a similar design, tie down straps are often used to surround the wheels of the all-terrain vehicle to secure it in the desired position on a truck bed. Other examples of locking devices for all-terrain vehicles or other vehicles prohibit substantial rotation of the steering column of the vehicle.

A problem with such designs is the difficulty required in attaching the locks to the all-terrain vehicles. For example, wheel locks and tie down straps must be applied to each wheel, and each tie down strap requires significant effort for the user to cover the wheel of the all-terrain vehicle and then secure the tie down strap to the truck. Additionally, the process requires a significant amount of the user's time in attaching the lock to the all-terrain vehicle.

Another locking design in the prior art is a hitch that is mounted to a truck bed and design to connect with a rear-hitch of a conventional all-terrain vehicle to lock the all-terrain vehicle on a truck bed. In operation, the user must drive the all-terrain vehicle onto the truck bed and over the hitch such that the rear-hitch of the all-terrain vehicle is positioned proximate to this locking device. The user may then couple the hitch to the all-terrain vehicle when the all-terrain vehicle is stationed at the desired position. While this design provides a means for securing the all-terrain vehicle on the truck bed, it is difficult for the user to utilize since the locking device attaches to the rear of the all terrain vehicle. It is often difficult for the user, especially when the user is alone, to determine where to properly position the all-terrain vehicle on the truck bed for the desired connection between the locking device and the all-terrain vehicle to be accurately accomplished.

What is needed, then, and not found in the prior art, is an apparatus for locking an all-terrain vehicle on a mobile platform such that it is easy for the user to connect the all terrain vehicle to the apparatus and such that the apparatus provides a means for preventing undesired movement of the all-terrain vehicle within the bed of the truck as well as theft of the all-terrain vehicle.

SUMMARY OF THE INVENTION

An object of the present invention is to provide an apparatus for securing an all terrain vehicle within the bed of a truck.

It is a further object of the present invention to provide an apparatus for locking an all-terrain vehicle within the bed of a truck to prevent theft.

It is yet a further object of the present invention to provide an apparatus for locking an all-terrain vehicle within the bed of the truck that it is simple for a user to connect the all-terrain vehicle to the locking apparatus.

It is an additional object of the present invention to provide an apparatus for securing an all-terrain vehicle within the bed of the truck that prevents undesired movement of the all-terrain vehicle within the bed of the truck.

The present invention is a locking assembly that is used to secure an all-terrain vehicle on a platform that is mobile or transportable, such as a truck bed or a common trailer bed. The locking assembly serves as a means for fastening the all-terrain vehicle to the platform, and includes a securing member that is attachable to the all-terrain vehicle and a receiving member that may be mounted to the transportable platform. The securing member preferably is T-shaped, and the securing member is designed to be attached to the front end of the rack of the all-terrain vehicle. The securing member has a base plate that is attached to the front end of the frame of the all-terrain vehicle, while a locking cantilever bar is attached to the base plate and extends away from the all-terrain vehicle. The receiving member is mounted to the mobile platform, and the receiving member includes a base support member, a post member that is perpendicularly attached to the base support member, and a locking clevis. The base support member is attached to the platform, and one end of the post member is further attached to the base support member. The locking clevis mounted to the opposing end of the post member, and is designed to engage the locking cantilever bar of the support member to secure the position of the all-terrain vehicle.

In operation, the user drives the all-terrain vehicle onto the mobile platform. The user directs the all-terrain vehicle onto the platform such that the locking cantilever bar is positioned between the arms of the locking clevis. The securing member is thereby coupled to the locking clevis using a conventional pin to secure the position of the all terrain vehicle on the mobile platform.

These and other objects of the invention are accomplished through the present locking assembly for securing an all-terrain vehicle to a transportable platform such that the all-terrain vehicle is secured from theft and undesired movement via the locking assembly.

BRIEF DESCRIPTION OF THE DRAWINGS

A locking assembly for all-terrain vehicles embodying the features of the present invention is depicted in the accompanying drawings which form a portion of this disclosure and wherein.

DESCRIPTION OF THE PREFERRED EMBODIMENTS

Figure 1:
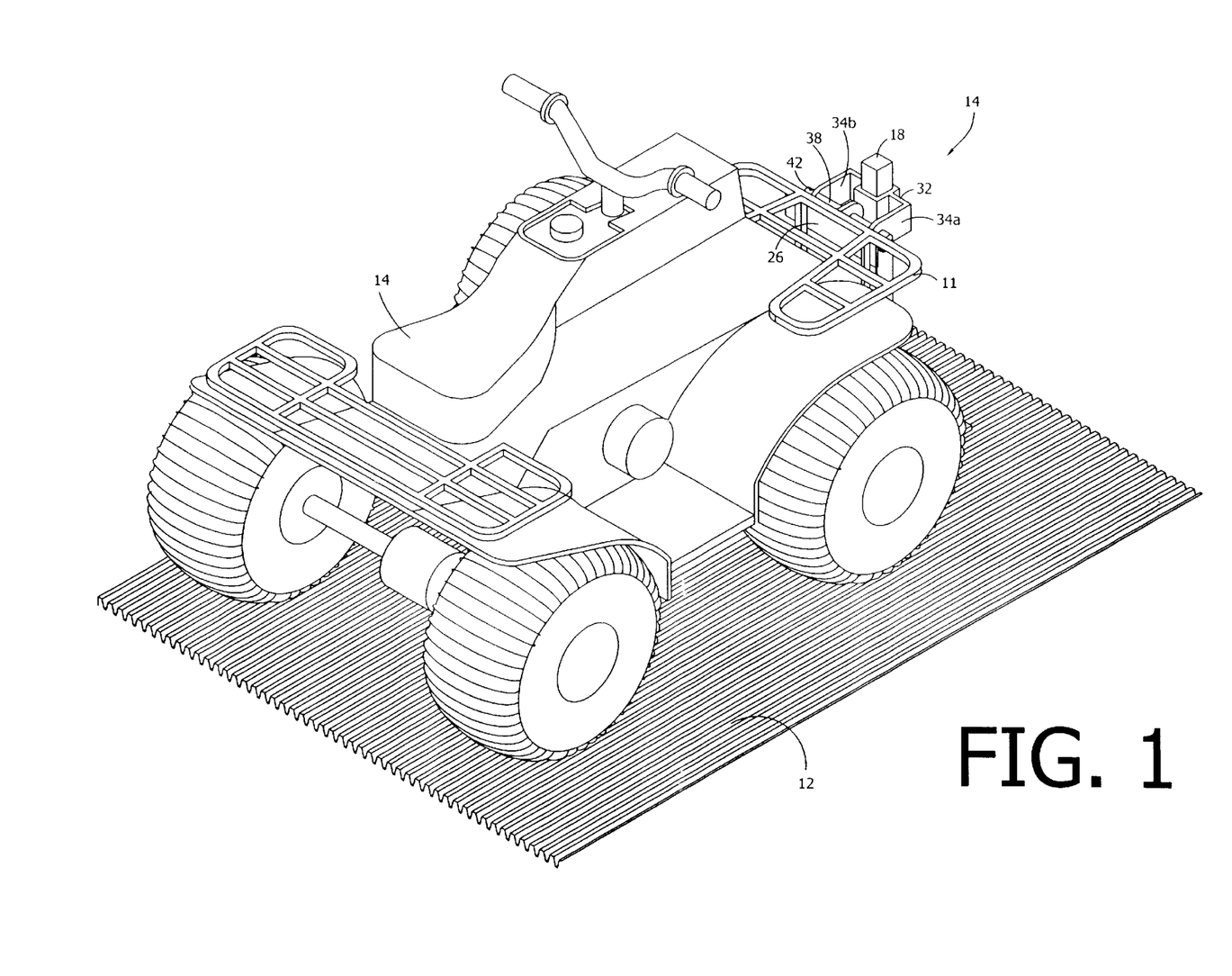
FIG. 1 is a perspective view of an all-terrain vehicle secured to a platform using the locking assembly of the present invention.

Looking at FIG. 1, a conventional all-terrain vehicle 10 is mounted on a platform 12 using the locking assembly 14 of the present invention. The locking assembly 14 of the present invention may be used with any one of several types of all-terrain vehicles 10 known in the art, with the most common examples being either a three-wheel all-terrain vehicle or a four-wheel all-terrain vehicle. Additionally, the locking assembly 14 is preferably mounted on a mobile platform 12, such as a truck bed or a conventional trailer platform, so that the all-terrain vehicle 10 can be securely contained while being transported. The locking assembly 14 is mounted to both the rack 11 and the platform 12 such that when the all-terrain vehicle 10 is coupled with the locking assembly 14, the all terrain vehicle 10 will not be able to be moved on the platform 12 or removed from the platform 12.

Figure 2:
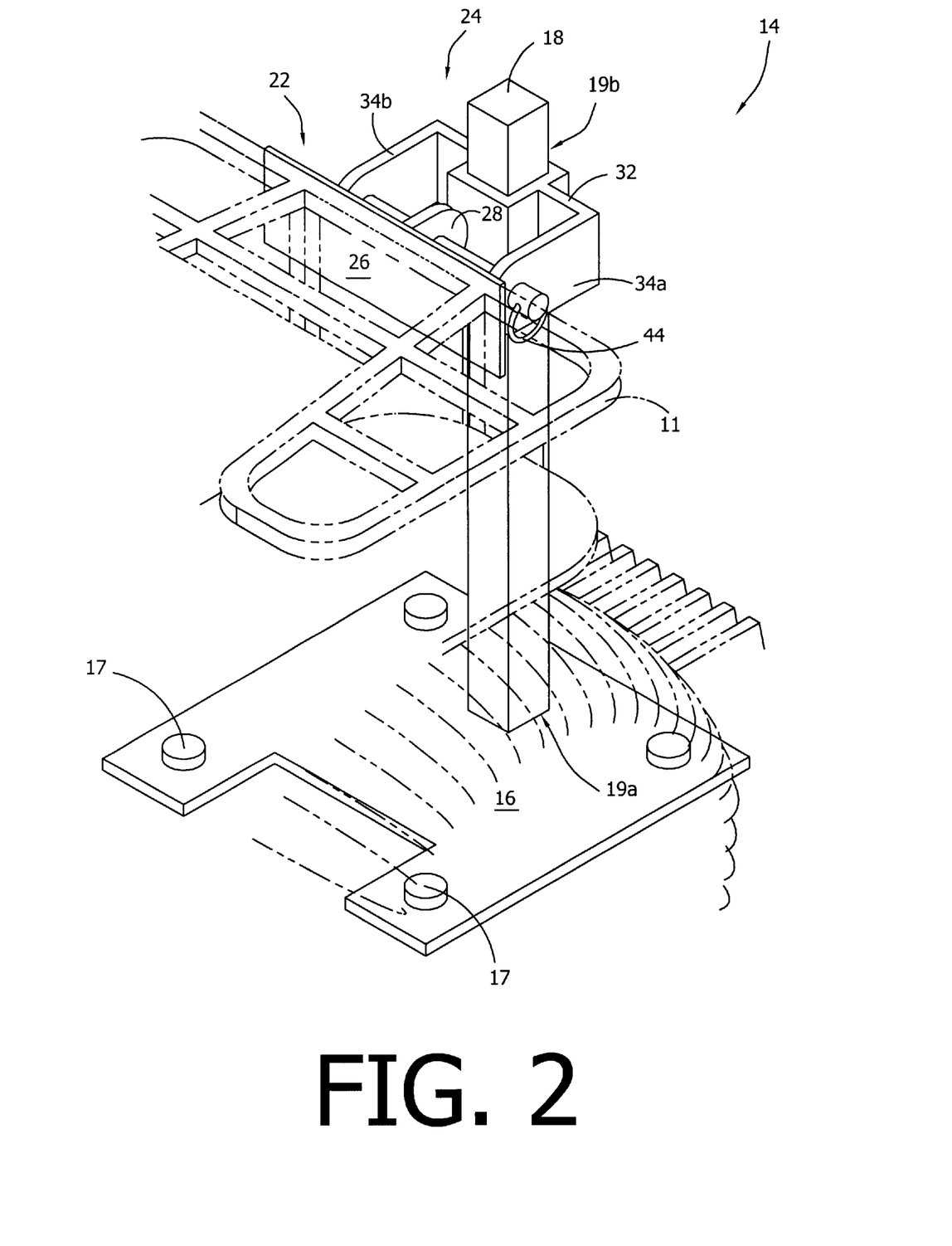
FIG. 2 is a perspective view of the locking assembly of the present invention, with a portion of the all-terrain vehicle being illustrated in phantom.
Figure 3:
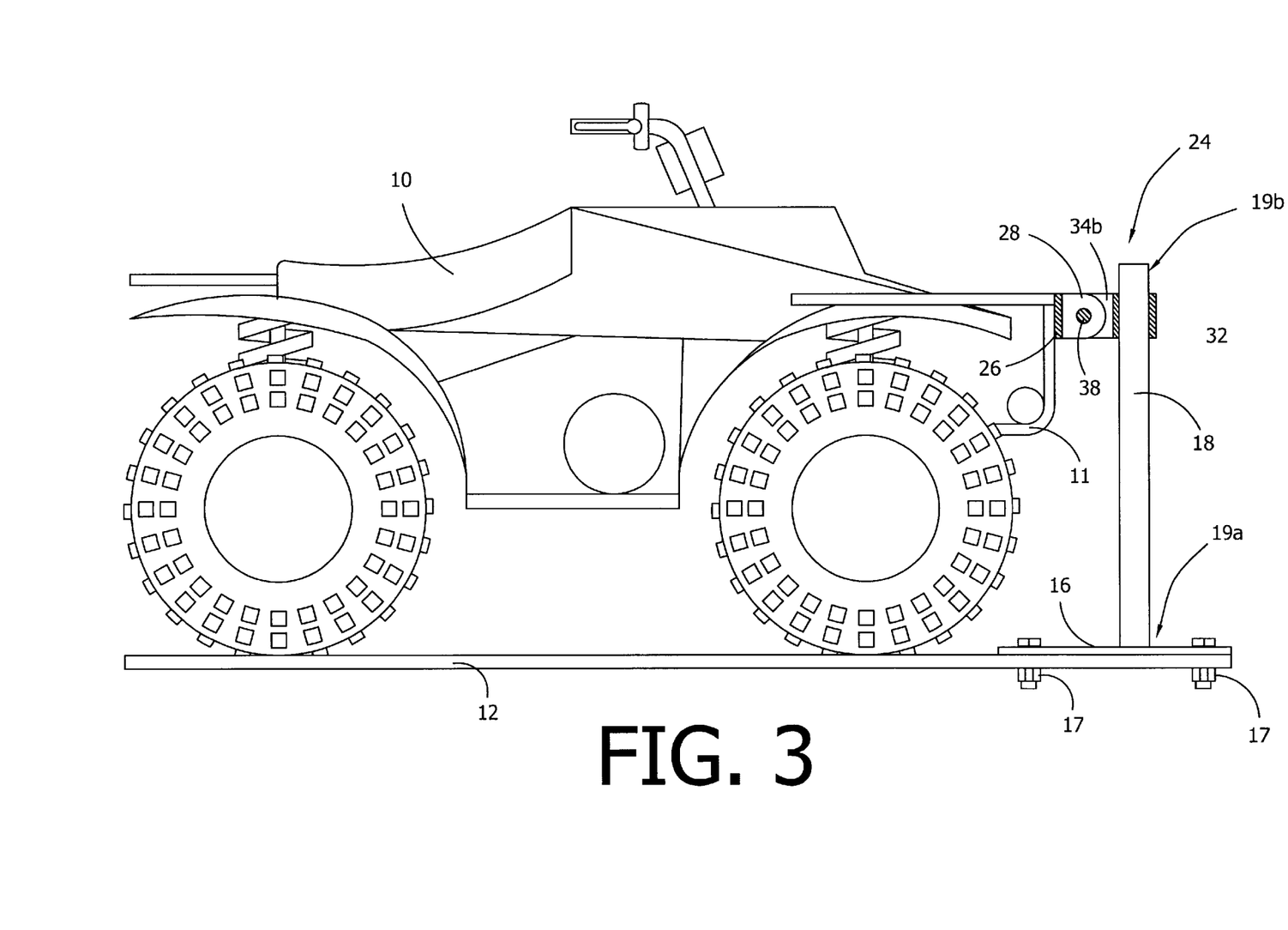
FIG. 3 is a side elevational view of the all-terrain vehicle secured to the platform using the locking assembly of the present invention, with the fastening means being illustrated as a sectional view.
Figure 4:
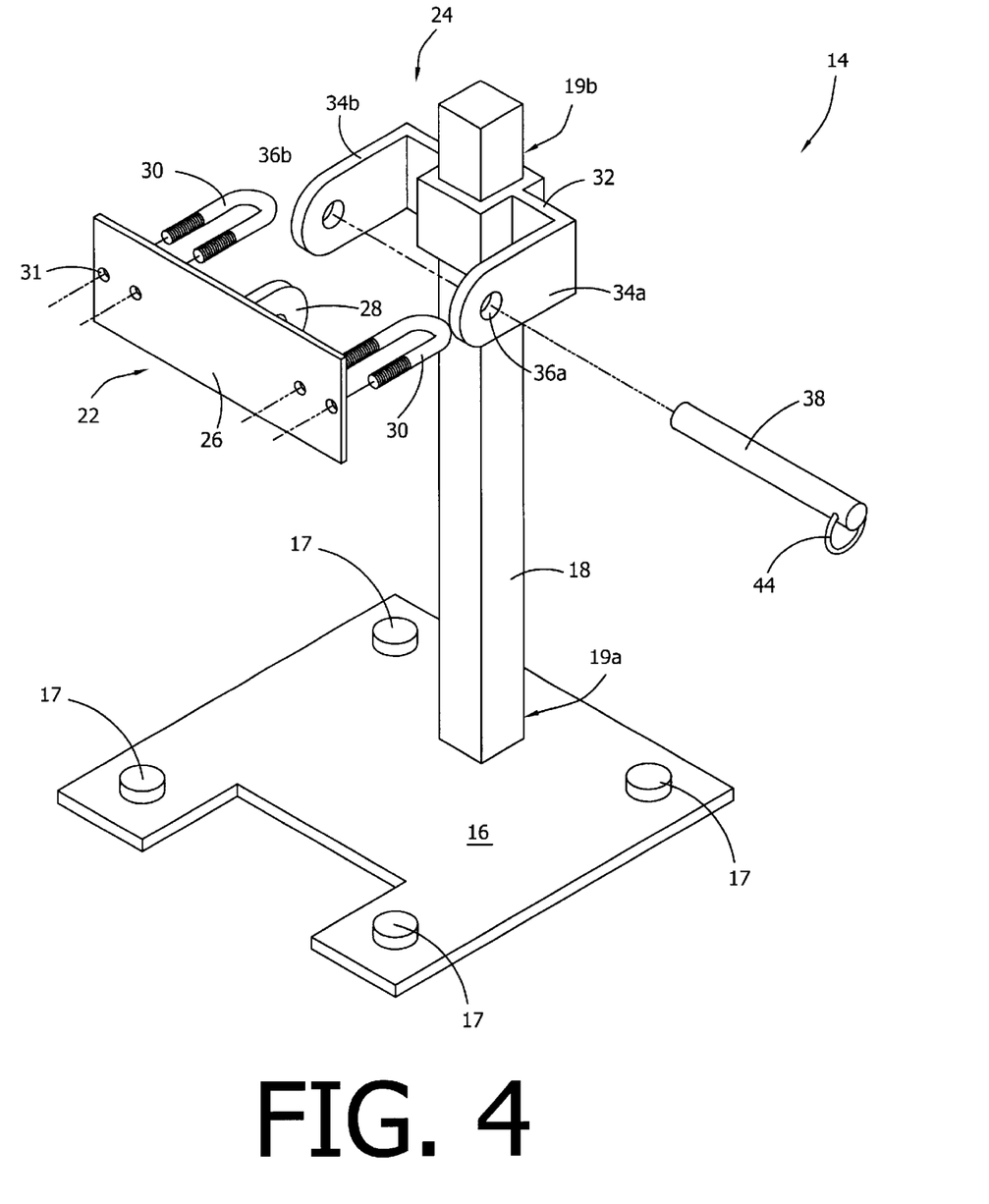
FIG. 4 is a perspective of the locking assembly of the present ivnention.
Figure 5:
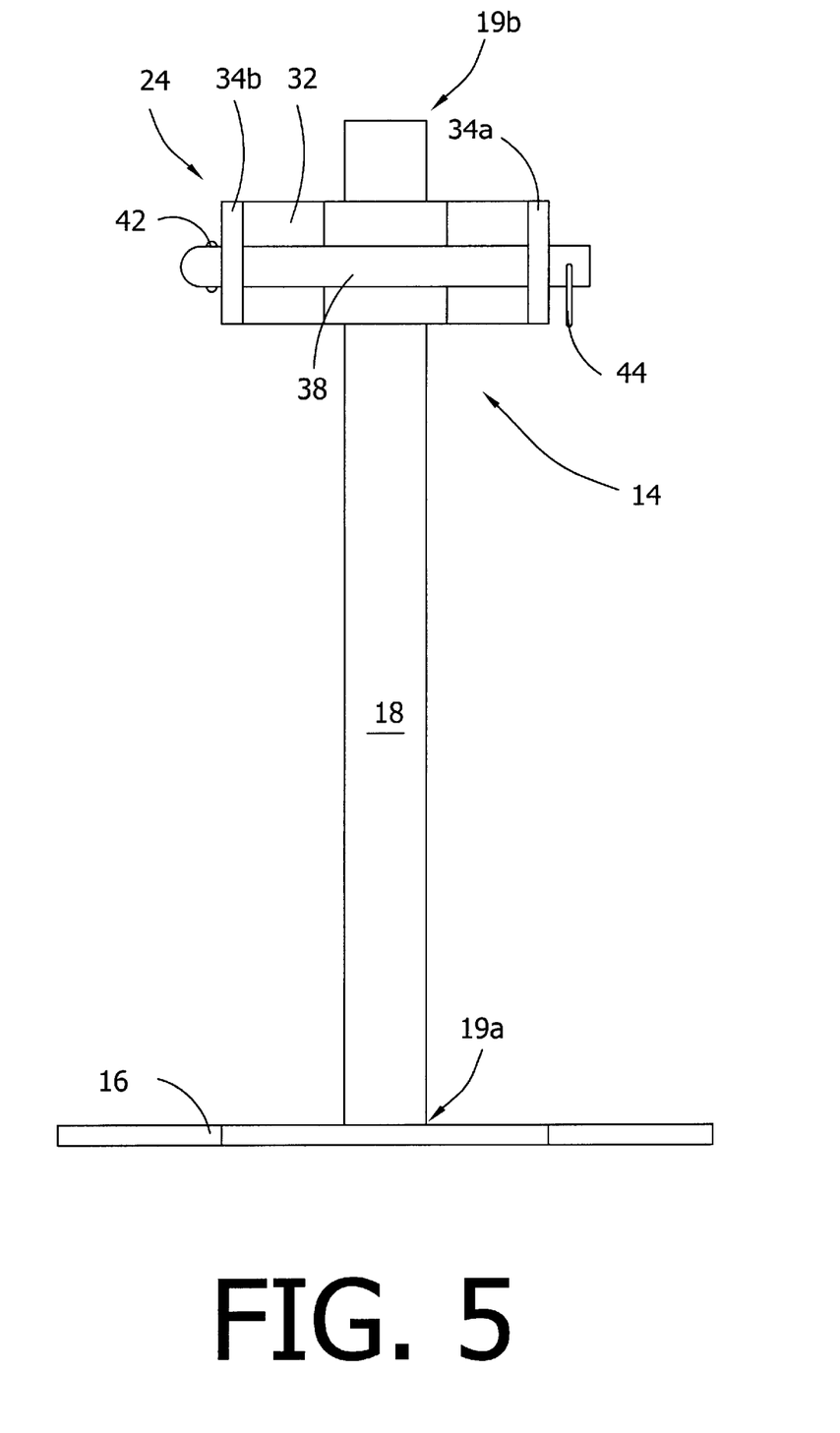
FIG. 5 is a front elevational view of the receiving member of the locking assembly of the present invention.
Figure 6:
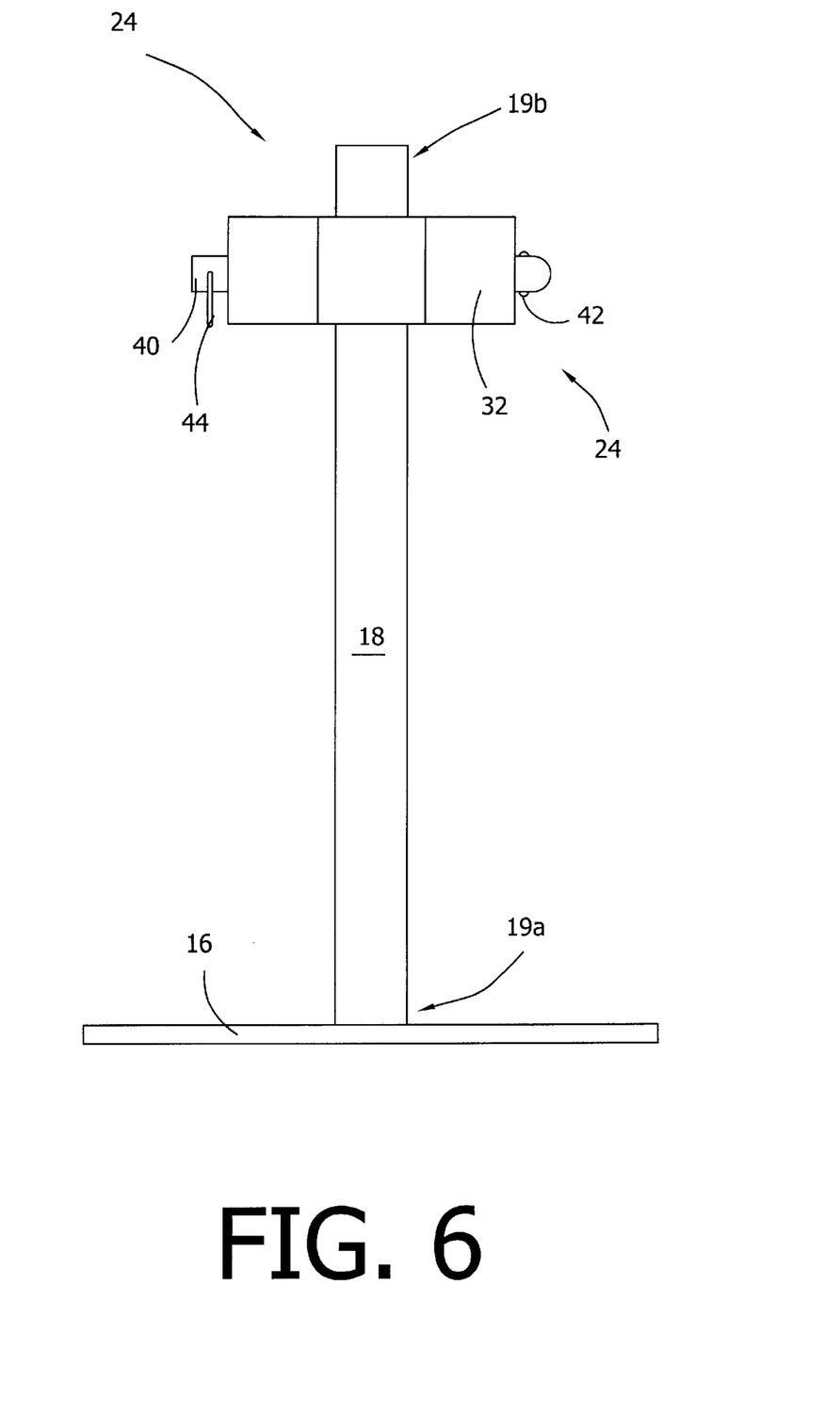
FIG. 6 is a rear elevational view of the receiving member of the locking assembly of the present invention.
Figure 7:
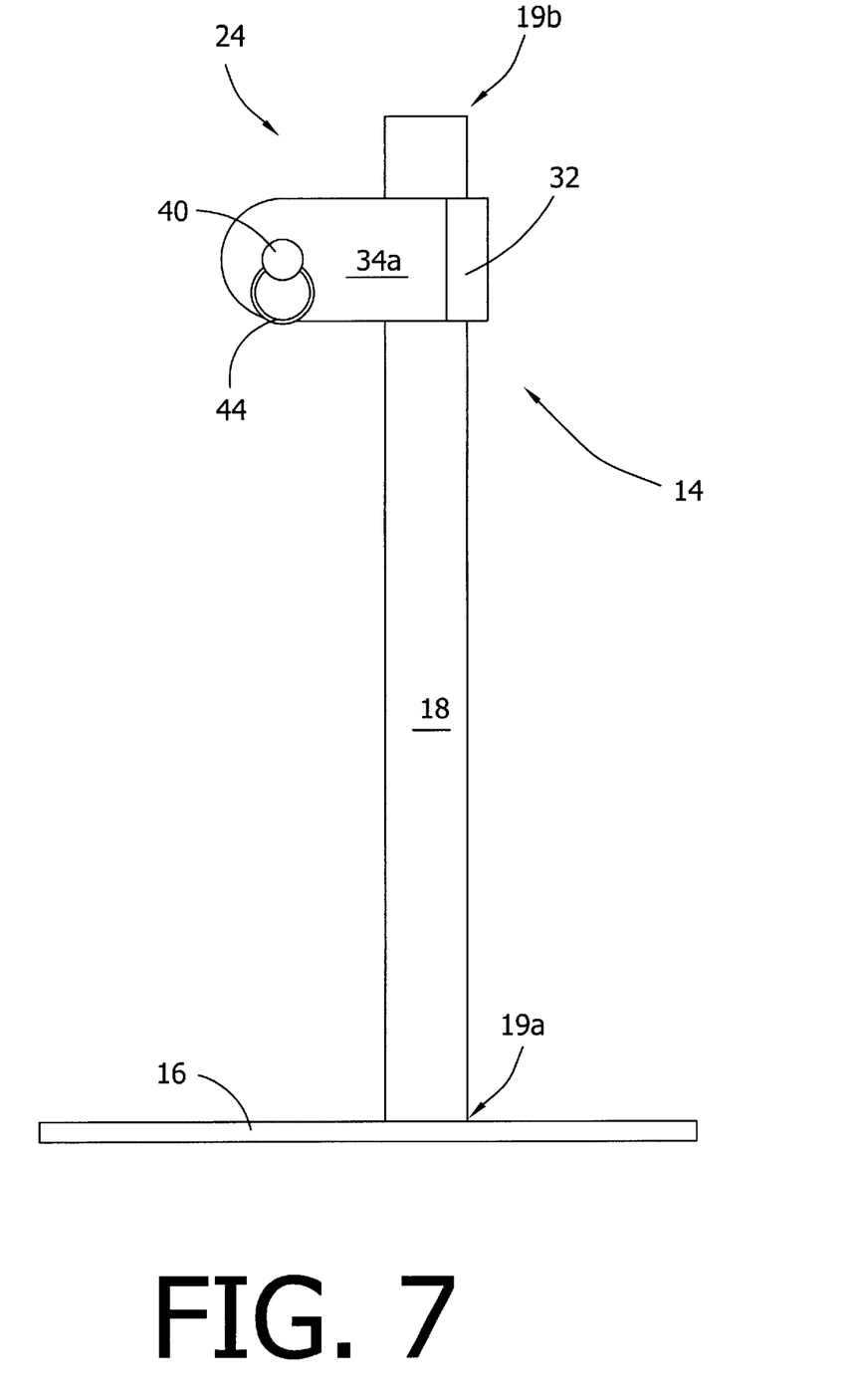
FIG. 7 is a side elevational view of the receiving member of the locking assembly of the present invention.
Figure 8:
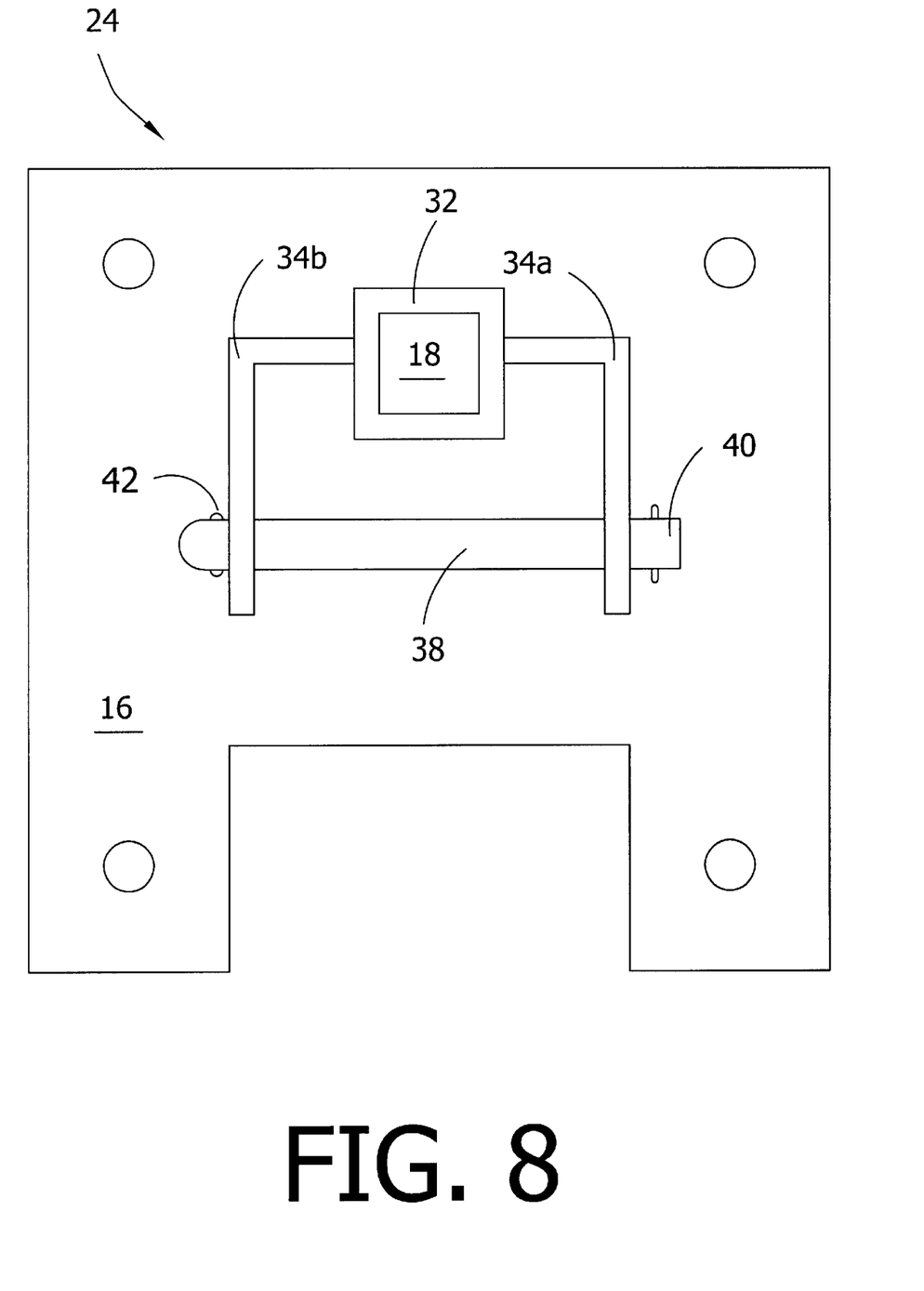
FIG. 8 is a top plan view of the receiving member of the locking assembly of the present invention.

Looking at FIGS. 2 and 4, the locking assembly 14 of the present invention includes a securing member 22, preferably having a T-shape, and a receiving member 24 that preferably includes a base support member 16, a post member 18, and a locking clevis 32. The base support member 16 of the receiving member 24 is securely mounted to the platform 12, preferably through the use of bolts 17 that rigidly connect the base support member 16 to the platform 12 (see FIGS. 2 and 3). The base support member 16 is a conventional plate made of a strong material, such as steel, such that the base support member 16 can withstand significant forces applied to it (such as by the all-terrain vehicle 10 while be loaded onto the platform 12) and remain connected to the platform 12. The post member 18 has a proximal end 19a and a distal end 19b, with the proximal end 19a of the post member 18 being rigidly mounted to the base support member 16. The post member 18 is connected to the base support member 16 such that the post member 18 is substantially perpendicular to the base support member 16. As with the base support member 16, the post member 18 is made of a strong and rigid material, such as steel, such that it can withstand any forceful contact by the all-terrain vehicle 10 and maintain the connection with the base support member 16.

As stated above, the locking assembly 14 serves as a fastening means for securing the position of the all-terrain vehicle 10 on the platform 12, as is most clearly illustrated in FIG. 4. In the preferred embodiment described above, the locking assembly 14 includes the securing member 22 that is attached to the all-terrain vehicle 10 (see also FIGS. 2 and 3) in addition to the receiving member 24. Conventionally, most embodiments of an all-terrain vehicle 10 include a rack or grill 11 that is an integral element of the frame of the all-terrain vehicle 10. Looking at FIG. 3, the securing member 22 is preferably attached to the rack 11 of the all-terrain vehicle 10. The securing member 22 preferably has a T-shape that includes a base plate 26 and at least one locking cantilever bar 28 extending therefrom, with the locking cantilever bar 28 being centrally attached to the base plate 26 in a perpendicular fashion. More specifically, the base plate 26 is attached to the rack 11 of the all-terrain vehicle 10 such that the locking cantilever bar 28 extends away from both the base plate 26 and the all-terrain vehicle 10. The securing member 22 may be coupled to the grill 11 of the all-terrain vehicle 10 by any of a plurality of conventional means known in the art, with the preferred embodiment implementing at least one U-shaped bracket 30 that extends through a pair of mounting apertures 31 traversing the base plate 26, as illustrated in FIG. 4.

The receiving member 24 of the locking assembly 14 can additionally be one of many embodiments to engage the securing member 22 to lock the all-terrain vehicle 10. In the preferred embodiment, the receiving member 24 of the locking assembly 14 includes the locking clevis 32 that is attached to the distal end 19b of the post member 18. Looking at FIGS. 4–8, the locking clevis 32 is a conventional clevis having a U-shaped design comprising two clevis arms 34a, 34b, with each clevis arm 34a, 34b defining a clevis aperture 36a, 36b. The locking clevis 32 is mounted to the post member 18 such that the arms 34a, 34b extend from the post member 18 toward the all-terrain vehicle 10. As a result, the locking cantilever bar 28 of the securing member 22 can be positioned between the arms 34a, 34b of the locking clevis 32. When the locking cantilever bar 28 is positioned between the clevis arms 34a, 34b, a conventional pin 38 may be used to couple with the locking clevis 32 to the locking cantilever bar 28 to secure the all-terrain vehicle 10 with the locking assembly 14 (see FIGS. 2 and 4). The pin 38 is conventional in design, preferably having a resilient button 42 mounted in one end and a pull ring 44 mounted in the other end (see FIGS. 5–8). The resilient button 42 is able to secure the pin 38 with the clevis arms 34a, 34b, and the pull ring 44 is used to help disengage the pin 38 from the locking clevis 32.

The operation of the locking assembly 14 is as follows. Initially, the user attaches the securing member 22 to the rack 11 of the all-terrain vehicle 10 using the U-shaped brackets 30, as discussed above. The user then loads the all-terrain vehicle onto the platform 12 using a method known in the art. Typically, the user provides a ramp (not illustrated) leading to the platform 12 such that the user may drive the all-terrain vehicle 10 onto the platform 12. The user is then able to guide the all-terrain vehicle 10 as the all-terrain vehicle 10 is being driven onto the platform 12 such that the locking cantilever bar 28 of the securing member 22 is directed toward the locking clevis 32, with the locking cantilever bar 28 being positioned between the clevis arms 34a, 34b.

Once the locking cantilever bar 28 is positioned between the arms 34a, 34b of the locking clevis 32, the user may couple the locking cantilever bar 28 with the locking clevis 32 using the pin 38, which is inserted through the clevis apertures 36a, 36b of the clevis arms 34a, 34b. Once the locking cantilever bar 28 is coupled with the locking clevis 32, the all-terrain vehicle 10 will be secured on the platform 12. In an additional embodiment, a pin aperture (not illustrated) may be included in the pin 38 such that it is proximate to the resilient button 42. The pin aperture would allow for a locking device (not illustrated), such as a pad lock, to engage the pin aperture to prevent removal of the pin 38, which would provide a secure engagement of the all-terrain vehicle 10 with the locking assembly 14.

Thus, although there have been described particular embodiments of the present invention of a new and useful LOCKING ASSEMBLY FOR ALL-TERRAIN VEHICLES, it is not intended that such references be construed as limitations upon the scope of this invention except as set forth in the following claims.

What is claimed is:

1. A locking assembly for securing an all-terrain vehicle on a platform, the all-terrain vehicle including a frame having a front end and rear end, said loching assembly comprising:
    a securing member attached to the all-terrain vehicle, said securing member including
        a base plate attached to the front end of the frame of the all-terrain vehicle; and
        a locking cantilever bar centrally attached to said base plate such that said locking cantilever bar extends away from the front end of the frame of the all-terrain vehicle; and
    a receiving member attached to the platform, said receiving member including
        a base support member attached to the platform;
        a post member having a proximal end and a distal end, said proximal end of said post member attached to said base support member; and
        a locking clevis mounted to said distal end of said post member, said locking clevis including two parallel arms extending away from said post member;
    wherein said securing member is coupled to said receiving member to secure the all-terrain vehicle on the platform.

2. The locking assembly as described in claim 1 further comprising a locking pin, wherein said locking pin extends through said locking cantilever bar and said arms of said locking clevis to couple said locking cantilever bar with said locking clevis.

3. A locking assembly for protecting an all-terrain vehicle, the all-terrain vehicle including a frame having a front end and rear end, wherein said locking assembly comprises:
    a platform supporting the all-terrain vehicle;
    a receiving member attached to said mobile platform, said receiving member including
        a base support member attached to the platform;
        a post member having a proximal end and a distal end, said proximal end of said post member attached to said base support member; and
        a locking clevis mounted to said distal end of said post member, said locking clevis including two parallel arms extending away from said post member; and
    a securing member attached to the all-terrain vehicle, wherein said securing member is substantially T-shaped to include
        a base plate attached to the front end of the frame of the all-terrain vehicle; and
        a locking cantilever bar centrally attached to said base plate such that said locking cantilever bar extends away from the front end of the frame of the all-terrain vehicle;
    wherein said securing member is connected with said receiving member to secure the all terrain vehicle on said platform.

4. The locking assembly as described in claim 3 further comprising a locking pin, wherein said locking pin extends through said locking cantilever bar and said arms of said locking clevis to couple said locking cantilever bar with said locking clevis.

5. A locking assembly for an all-terrain vehicle, the locking assembly comprising:
    a platform for receiving the all-terrain vehicle;
    a post member having a proximal end and a distal end, said proximal end of said post member attached to said platform;
    a pair of parallel locking arms attached to said distal end of said post member, said locking arms extending away from said post member; and
    a substantially T-shaped securing member connected to the all-terrain vehicle such that said securing member is coupled with said locking arms to secure the all-terrain vehicle on said platform, wherein said securing member includes a base plate connected with the all-terrain vehicle and a locking cantilever bar attached to said base plate, said locking cantilever bar extending away from the all-terrain vehicle.

6. The locking assembly as described in claim 5 further comprising coupling means for connecting said securing member with said locking arms.

7. The locking assembly as described in claim 6 wherein said coupling means includes a locking pin, wherein said locking pin extends through said locking cantilever bar and said locking arms to secure said locking cantilever bar with said locking arms.

* * * * *